(12) United States Patent
Allston et al.

(10) Patent No.: US 7,174,861 B2
(45) Date of Patent: Feb. 13, 2007

(54) METHOD AND APPARATUS FOR FUELING AN INTERNAL COMBUSTION ENGINE

(75) Inventors: Brian K. Allston, Rochester, NY (US); John E. Kirwan, Troy, MI (US); James M. Haller, Victor, NY (US)

(73) Assignee: Delphi Technologies, Inc., Troy, MI (US)

( * ) Notice: Subject to any disclaimer, the term of this patent is extended or adjusted under 35 U.S.C. 154(b) by 145 days.

(21) Appl. No.: 10/662,868

(22) Filed: Sep. 15, 2003

(65) Prior Publication Data

US 2005/0056236 A1  Mar. 17, 2005

(51) Int. Cl.
*F02D 19/06* (2006.01)

(52) U.S. Cl. .................... 123/1 A; 123/525; 123/27 GE

(58) Field of Classification Search ................ 123/1 A, 123/3, 525, 527, 27 GE
See application file for complete search history.

(56) References Cited

U.S. PATENT DOCUMENTS

| 5,105,772 | A | | 4/1992 | Olsson et al. ................ 123/1 A |
| 5,139,002 | A | | 8/1992 | Lynch et al. ................. 123/575 |
| 5,524,582 | A | * | 6/1996 | Suh et al. .................. 123/179.8 |
| 5,549,083 | A | * | 8/1996 | Feuling .................... 123/179.5 |
| 5,566,653 | A | * | 10/1996 | Feuling .................... 123/179.8 |
| 5,787,864 | A | | 8/1998 | Collier, Jr. et al. .......... 123/492 |
| 6,189,523 | B1 | * | 2/2001 | Weisbrod et al. ............ 123/672 |
| 6,687,597 | B2 | * | 2/2004 | Sulatisky et al. ........... 701/104 |
| 2003/0089337 | A1 | | 5/2003 | Cohn et al. .................. 123/435 |
| 2004/0035395 | A1 | | 2/2004 | Heywood et al. ............ 123/435 |

FOREIGN PATENT DOCUMENTS

JP  58200049 A  11/1983

* cited by examiner

*Primary Examiner*—Stephen K. Cronin
*Assistant Examiner*—Jason Benton
(74) *Attorney, Agent, or Firm*—Patrick M. Griffin

(57) ABSTRACT

A combined gasoline and hydrogen fueling system for a gasoline-powered internal combustion engine, including, preferably, a rapid-start catalytic reformer for producing reformate gas containing hydrogen from gasoline. The reformate from the reformer is swept by air into the intake manifold of the cold engine where it is mixed with intake air and then drawn into the cylinders and ignited conventionally to start the engine. A computer-based reformer control system optimizes the amount of reformate formed and the resulting reformate/air mixture. The reformer control system interfaces or is integral with a computer-based gasoline and air supply system for the engine, the two systems cooperating to optimize a mixture of gasoline and reformate in the intake manifold at all times during warming of the engine and its exhaust catalyst to steady-state operating temperature. Preferably, flow of reformate is terminated thereafter.

23 Claims, 3 Drawing Sheets

METHOD AND APPARATUS FOR FUELING AN INTERNAL COMBUSTION ENGINE

TECHNICAL FIELD

The present invention relates to internal combustion engines; more particularly, to a method for fueling an internal combustion engine using both a hydrocarbon fuel, such as gasoline, diesel fuel or ethanol, and hydrogen; and most particularly, to method and apparatus for starting an internal combustion engine using a hydrogen-containing fuel gas, preferably catalytically reformed gasoline or diesel fuel, to minimize cold-start hydrocarbon engine emissions.

BACKGROUND OF THE INVENTION

At cold start-up of a hydrocarbon fuel powered internal combustion engine, fuel combustion typically is incomplete, resulting in significant and undesirable amounts of unburned hydrocarbons in the engine exhaust. Further, these residual hydrocarbons are incompletely oxidized by an exhaust gas catalytic converter which is also cold, such that a cold-starting engine typically emits significant amounts of unburned hydrocarbons to the atmosphere. This situation continues to pertain until the engine and the converter reach their respective intended operating temperatures.

What is needed in the art is a means for starting an internal combustion engine and fueling it while producing an engine exhaust containing significantly reduced amounts of unburned hydrocarbons.

It is a principal object of the present invention to provide an internal combustion engine exhaust having substantially reduced amounts of unburned hydrocarbons under all conditions of engine operation.

It is a further object of the invention to provide a system for fueling an engine whereby steady-state hydrocarbon fuel, such as raw gasoline or diesel fuel, is withheld until engine operating conditions permit complete combustion of the steady-state fuel.

SUMMARY OF THE INVENTION

Briefly described, a fueling system for an internal combustion engine includes means for providing a hydrogen-containing gas for starting the engine to prevent formation of engine exhaust containing unburned hydrocarbons. Such means includes a hydrogen supply system, such as a hydrogen-filled pressure vessel or a liquid-fuel catalytic reformer. In a currently preferred embodiment, a rapid-start catalytic reformer produces reformate gas from a liquid fuel, such as gasoline, diesel fuel or ethanol, the reformate containing hydrogen and carbon monoxide. Preferably, the reformer is supplied with the same fuel as is the engine at steady state. With combustion pre-heating, the reformer begins producing reformate in a very short period of time. The reformate is swept by air into the intake manifold of the cold engine where it is mixed with intake air and then drawn into the cylinders and ignited conventionally to start the engine. A computer-based reformer control system optimizes the amount of reformate formed and the resulting reformate/air mixture. The reformer control system interfaces with a computer-based hydrocarbon fuel and air supply system for the engine which begins injecting hydrocarbon fuel into the reformate in the manifold as the engine warms. The two control systems cooperate in response to engine torque requirements to optimize the mixture of hydrocarbon fuel and reformate in the intake manifold at all times during warming of both the engine and the exhaust catalyst to their respective steady-state operating temperatures, and to minimize amounts of unburned hydrocarbons in the engine's exhaust at all times.

BRIEF DESCRIPTION OF THE DRAWINGS

The present invention will now be described, by way of example, with reference to the accompanying drawings, in which.

DESCRIPTION OF THE PREFERRED EMBODIMENTS

The following description and the drawings are directed to method and apparatus for operation of an internal combustion engine fueled at steady-state by gasoline. It should be understood that similar methods and apparatus for engines employing other hydrocarbon fuels at steady-state, such as diesel fuel, ethanol, and the like, are fully comprehended by the invention.

Figure 1:
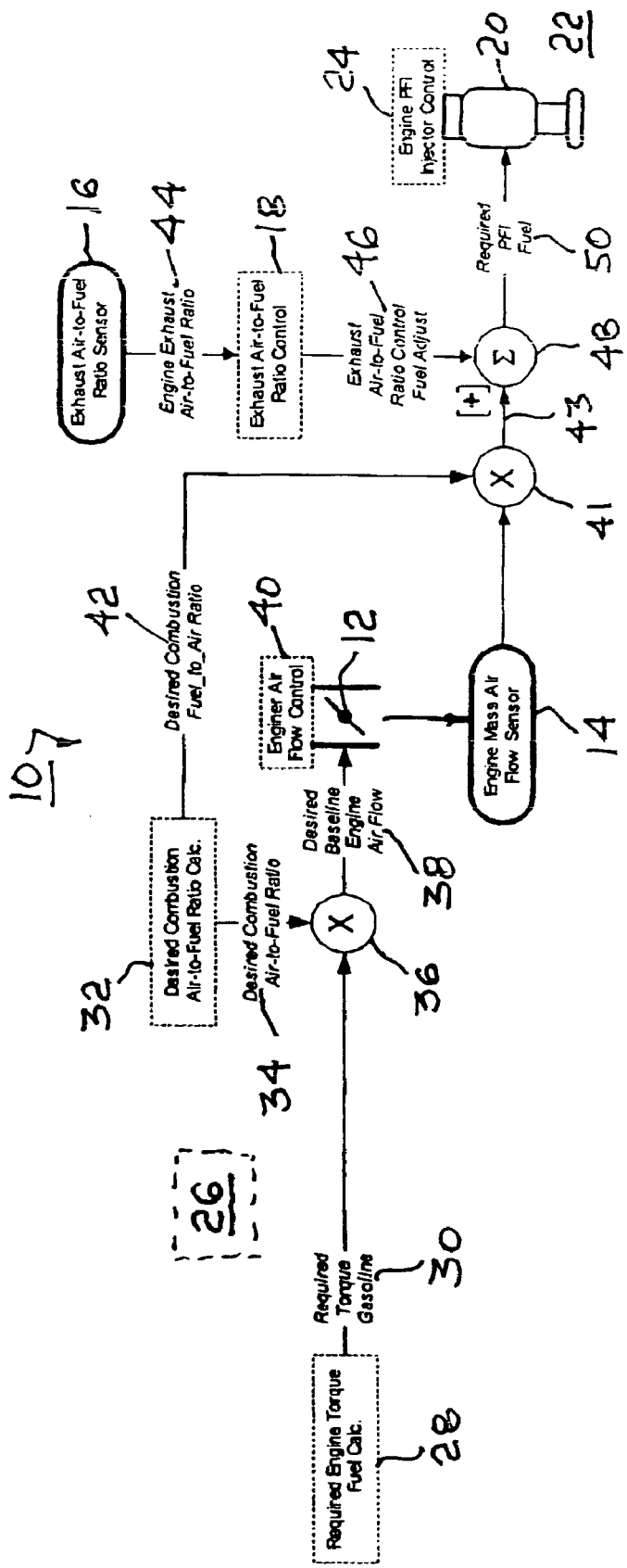
FIG. 1 is a schematic diagram of a prior art engine fueling control function responsive to torque demand, using gasoline as the hydrocarbon fuel.

Referring to FIG. 1, a prior art engine management function 10 includes an engine intake air flow control valve (throttle) 12, an engine mass air flow sensor 14, an exhaust air-to-fuel ratio sensor 16, an exhaust air-to-fuel ratio control means 18, at least one fuel injector 20 disposed in an engine intake manifold 22, and an engine fuel injector control means 24. Prior art function 10 is managed by a programmable electronic engine control module 26.

In prior art function 10, for any given torque requirement, the gasoline requirement is calculated 28 (typically from a look-up table in the controller) and forwarded 30. Similarly, a desired combustion air-to-fuel ratio is calculated 32 (also from a look-up table) and forwarded 34. The two values are multiplied 36 to yield a desired baseline engine air flow 38 which is forwarded to an engine air flow control algorithm 40 which sets the opening of intake air control valve 12. The resulting actual air flow is determined by engine mass air flow sensor 14, and the output air flow value is multiplied 41 by the desired fuel-to-air ratio 42 to yield a non-adjusted required fuel value 43. The exhaust air-to-fuel ratio sensor 16 provides an output 44 to control means 18 which adjusts 46 the injected fuel trim value required to maintain the desired fuel-to-air ratio 42, in known fashion. This amount is summed 48 with (subtracted from) the non-adjusted fuel value 43 to provide an adjusted required fuel amount 50 which fuel injector control means 24 causes fuel injector 20 to inject into manifold 22.

Figure 2:
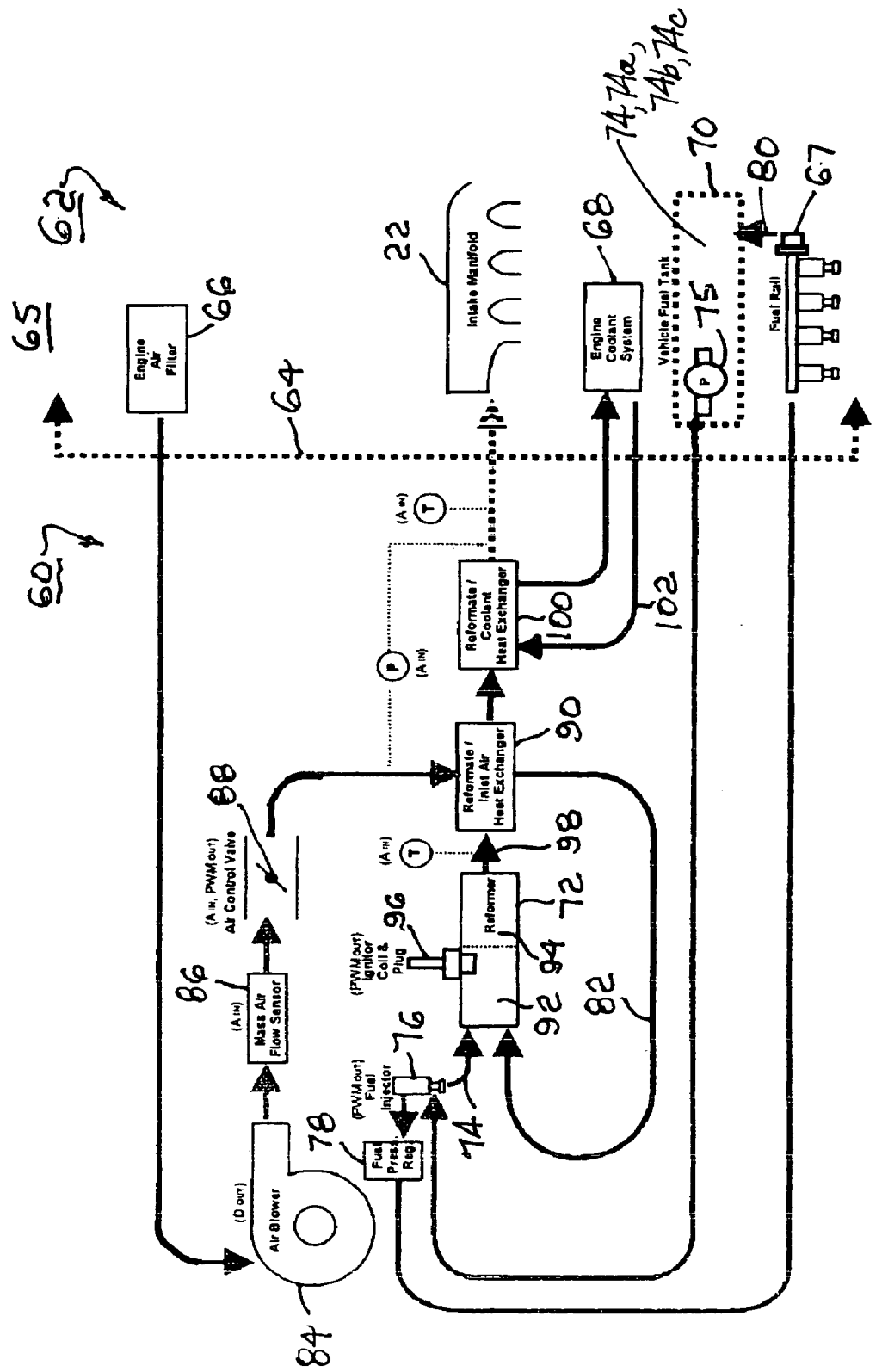
FIG. 2 is a schematic diagram of an onboard hydrocarbon reformate generation system for supplying hydrocarbon reformate to an engine manifold.

Referring to FIG. 2, a reformate fueling system 60 is provided for symbiotic attachment to an internal combustion engine 62 across a functional interface 64. Engine 62 may be a motive engine for a vehicle 65, for example, an automobile or truck, in known fashion, and reformate fueling system 60 is preferably carried onboard such a vehicle. Engine 62 comprises intake manifold 22 and fuel injection fuel rail 67. Reformate fueling system 60 may also draw from and utilize an existing engine air filter 66, engine coolant system 68, and fuel tank 70, containing liquid hydrocarbon fuel 74 such as, for example, gasoline 74a, diesel fuel 74b or ethanol 74c.

In reformate generation system 60 for fueling engine 62 in accordance with the invention, a catalytic fuel reformer 72 is connected to a hydrocarbon fuel supply subsystem originating in fuel tank 70 (a recirculating fuel system is shown). Reformer 72 receives fuel 74 delivered by fuel pump 75 from fuel tank 70 via a dedicated reformer fuel injector 76. Preferably and additionally, bypass fuel flows through injector 76 and through a pressure regulator 78, supplying fuel rail 67 in known fashion, the excess fuel returning 80 to tank 70. As can be appreciated in the art, while a recirculating fuel system is shown in FIG. 2, the present invention can be used with other fuel systems as well, such as with non-circulating "dead headed" fuel systems (not shown).

Reformer 72 is also supplied with metered air 82 originating in engine air filter 66. Air blower 84 draws air through filter 66 and discharges air under pressure through mass air flow sensor 86. A reformer air flow control valve 88 regulates the mass air flow. Air is warmed by passage through a reformate/inlet air heat exchanger 90, whereby the air is heated and the hot reformate is partially cooled, and the air then passes into reformer 72.

Reformer 72 includes an air and fuel injection and mixing chamber 92 in communication with reforming chamber 94. At start-up, fuel injected into chamber 92 by injector 76 is ignited by a spark igniter 96 extending into chamber 92. This provides a hot combustion exhaust which passes through the reformer, rapidly warming the catalytic elements therein. When ignition is terminated, the warmed catalytic elements in chamber 94 begin reforming the fuel/air mixture continuously supplied to the reformer to yield a hydrogen containing fuel gas, hydrocarbon reformate 98. From heat exchanger 90, reformate 98 is preferably passed through an additional heat exchanger 100, which further cools reformate 98 by heat exchange with coolant 102 from engine coolant system 68, and is discharged into intake manifold 22.

Figure 3:
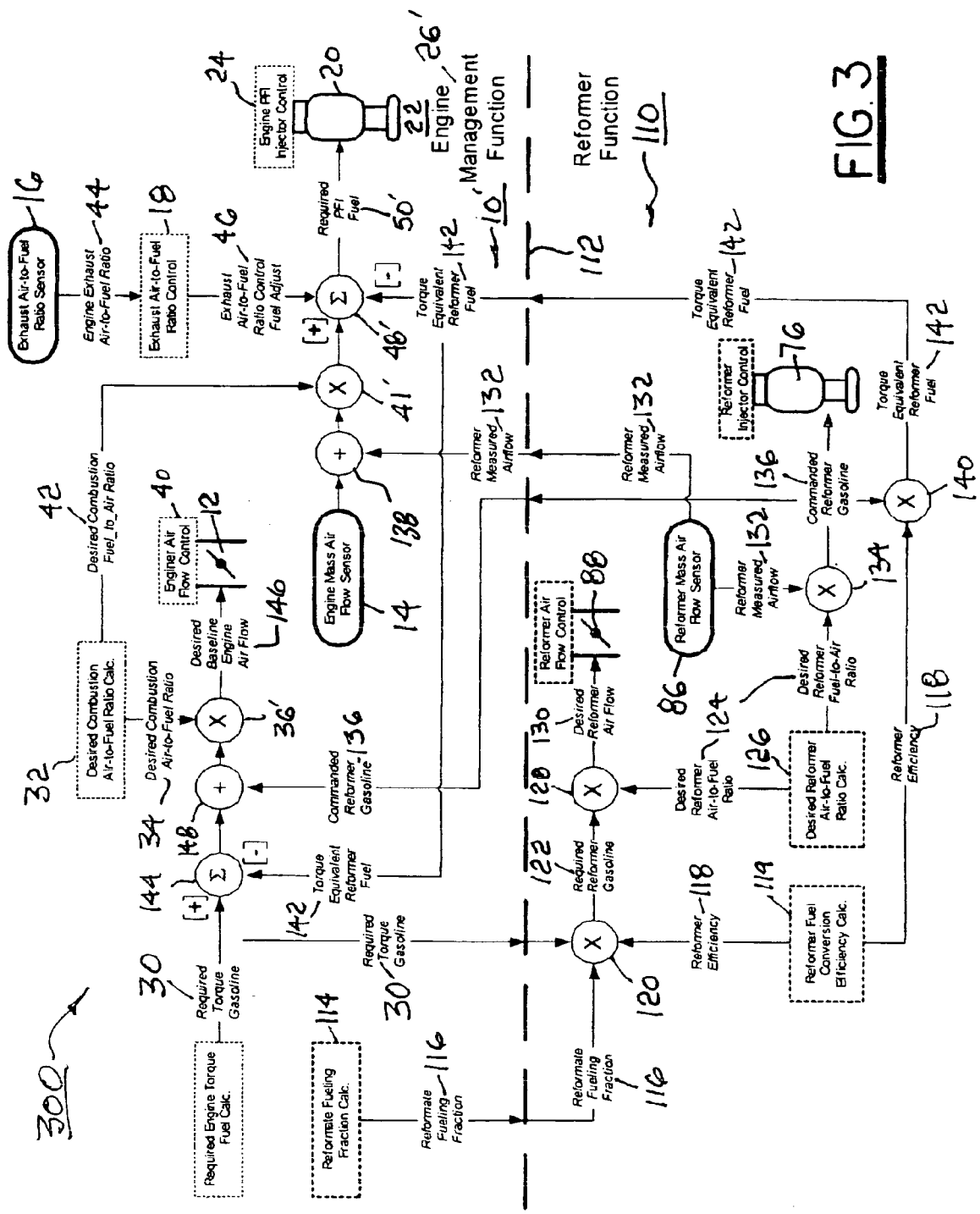
FIG. 3 is a schematic diagram of an engine fueling control function in accordance with the invention, combining the prior art gasoline fueling function shown in FIG. 1 with a novel reformate engine fueling function.

Referring to FIGS. 1, 2, and 3, in a combined hydrocarbon fuel and reformate fueling system 300 for an internal combustion engine, a reformer management function 110 interfaces with engine management function 10' across a functional interface 112. The principal engine fueling function steps in function 10' are identical with those described hereinabove under function 10 and shown in FIG. 1.

Engine management function 10' chooses when to initiate and engage reformate fueling system 60 to produce reformate for fueling engine 62, for example, when the engine is cold and it is desirable to prevent generation of exhaust gas containing unburned hydrocarbons. Reformer energy output demand is scheduled as a percentage of the fuel flow energy required for the demanded engine torque. Varying the reformate fraction permits optimization of exhaust composition and engine performance. The reformate fraction may comprise from 0% to 100% of the fuel for engine 62 at any given time. Preferably at engine startup, the engine is 100% fueled by reformate. Alternately, initial cranking may include from a fraction up to 100% hydrocarbon fuel for a short time to avoid potential delays in starting the engine while the reformer is starting up.

Engine function 10' calculates 114 a reformate fueling fraction 116 and communicates that fraction to reformer function 110. The hydrocarbon fuel flow required 30 to meet the torque demand imposed on the engine is also supplied to reformer function 110. The conversion efficiency 118 of the reformer is calculated 119, based on stored programmed data. The reformate fueling fraction 116, hydrocarbon fuel flow requirement 30 to meet the torque demand of the engine, and reformer efficiency 118 are combined 120, by algorithm, to determine the actual flow 122 of hydrocarbon fuel required at the reformer.

As described above, air is required in the reformer for reforming the hydrocarbon fuel. This air required for the reforming process must be accounted for in determining the total air flow through the engine. Control of engine air-to-fuel ratio is maintained through adjustment of direct engine intake air flow to compensate for the actual fuel flow and air flow used in production of reformate. A desired air-to-fuel ratio 124 for the reformer is calculated 126, based on stored program data. Required hydrocarbon fuel flow 122 is multiplied 128 by ratio 124 to yield the desired reformer air flow 130 which is then set by reformer air flow control valve 88. Reformer mass air flow sensor 86 determines the actual reformer air flow 132 which is multiplied 134 by the desired reformer fuel-to-air ratio 124 to yield a commanded reformer hydrocarbon fuel flow 136 to which reformer injector 76 responds to inject the commanded flow of hydrocarbon fuel into reformer 72.

The actual reformer air flow 132 is added 138 to the air flow measured by engine mass air flow 14 and is multiplied 41' by the desired combustion fuel-to-air ratio 42 to yield an equivalent fuel flow. However, because reformate is inherently less powerful than hydrocarbon fuel, the commanded reformer hydrocarbon fuel flow 136 must be combined 140 with the reformer efficiency 118 to yield a flow of reformer fuel 142 which is the torque equivalent of required torque hydrocarbon fuel 30. The torque equivalent reformer fuel 142 is subtracted 144 from the gross required torque hydrocarbon fuel 30, which difference depends upon the relative percentages of simultaneous fueling by reformate and hydrocarbon fuel together. In setting the desired baseline engine air flow 146, the commanded reformer hydrocarbon fuel is added 148 to the output of 144 and then multiplied 36' by the desired combustion air-to-fuel ratio 34.

Further, the torque equivalent reformer fuel 142 is subtracted 48' from output 41', adjusted 46 by any fuel in the engine exhaust, as in the prior art, and a required injection value 50' is forwarded to engine fuel injector control means 24 to cause fuel injector 20 to inject amount 50 into manifold 22.

Proper engine torque output is maintained during reformer operation through two mechanisms. First, the process controls the reformer to produce reformate energy output equivalent to the engine controller demand independent of reformer efficiency. The reformer fuel input is adjusted, based on the current energy conversion efficiency of the reformer. Second, the engine controller adjusts hydrocarbon fueling for error in the actual reformer energy output, relative to the reformer energy demand, should the demand exceed the output capacity of the reformer system, or should system dynamics cause momentary delays in reformer response.

Combined engine management function 10' and reformer function 110 are thus capable of fueling engine 62 at any desired ratio of reformate to hydrocarbon fuel, from 100% reformate to 100% hydrocarbon fuel. Preferably, engine 62 is fueled predominately or exclusively by hydrogen-containing fuel gas, such as hydrogen gas or reformate gas, either when engine 62 is cold, as at startup, or when exhaust air-to-fuel ratio sensor 16 detects fuel levels in the exhaust that are at or above a predetermined acceptance level. Preferably, engine 62 is fueled as little as possible by a hydrogen-containing gas for fuel economy reasons.

Thus, for example, in a typical operation, at cold engine and reformer start-up, fueling fraction 114 is nearly or 100% reformate. Reformer 72 is quickly preheated by ignition of air/fuel mixture in chamber 92 and begins producing reformate 98 in chamber 94 shortly thereafter. Reformate 98 is passed immediately to intake manifold 22 and thence to the cylinders of engine 62 where it is combusted to start the engine, producing an exhaust substantially free of unburned hydrocarbons. The engine immediately begins to warm, as does the exhaust catalytic converter. In accordance with an algorithm programmed into engine management controller 26' and dependent at least upon engine temperature, unburned fuel levels in the exhaust, and engine torque requirements, hydrocarbon fueling system 10' begins injecting small amounts of hydrocarbon fuel into manifold 22, while simultaneously reducing the reformate fueling fraction 116. Preferably, when the engine and exhaust converter have reached their respective steady-state operating temperatures, the reformate fueling fraction is set to an optimum value to provide good fuel economy and low engine emissions. This value may be as low as 0% reformate fuel, depending on specific needs for vehicle operation.

It is understood that, while in the preferred embodiment described, a reformer is used to convert a hydrogen fuel such as gasoline, diesel fuel or ethanol, into a hydrogen-containing gas (reformate), the fueling system can operate alternatively using hydrogen gas fed directly from a storage vessel.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for fueling an internal combustion engine with a hydrocarbon fuel and a hydrogen-containing fuel gas, comprising the steps of:
    a) starting said engine on a mixture of said fuel and said fuel gas wherein at least 90% of the motive energy of said engine is derived from said hydrogen-containing fuel gas; and
    b) progressively changing the supply ratio between said hydrocarbon fuel and said hydrogen-containing fuel gas such that, when said engine reaches an equilibrium operating temperature, an optimum fraction of the motive energy of said engine is derived from said hydrocarbon fuel and said hydrogen-containing fuel gas.

2. A method in accordance with claim 1 wherein said optimum fraction is at least 90% hydrocarbon fuel.

3. A method in accordance with claim 1 wherein 100% of the motive energy of said engine is derived from said hydrogen-containing fuel gas during said starting of said engine.

4. A method in accordance with claim 1 further comprising a first step of cranking said engine on a mixture of up to 100% of hydrocarbon fuel prior to said starting step, to optimize engine start time.

5. A method in accordance with claim 1 wherein said supply ratio is optimally changed to minimize levels of unburned hydrocarbons in an exhaust stream of said engine.

6. A method in accordance with claim 1 wherein said supply ratio is changed by adding hydrocarbon fuel to provide a second engine torque that exceeds a first engine torque that said optimum fraction can provide.

7. A system for fueling an internal combustion engine with a hydrocarbon fuel and a hydrogen-containing fuel gas, comprising:
    a) a hydrocarbon fuel supply system; and
    b) a hydrogen-containing fuel gas supply system, wherein said engine is fueled at least 90% by said hydrogen-containing fuel gas at engine start-up and by an optimum mixture of hydrocarbon fuel and said hydrogen-containing fuel gas at engine steady-state operating conditions.

8. A system in accordance with claim 7 wherein said hydrogen-containing fuel gas supply system is a pressure vessel.

9. A system in accordance with claim 7 wherein said hydrogen-containing fuel gas supply system is a hydrocarbon fuel reformer.

10. A system in accordance with claim 7 further comprising a control system for regulating relative supply of said hydrocarbon fuel and said hydrogen-containing fuel gas at any given time.

11. A system in accordance with claim 10 wherein an amount of hydrocarbon fuel supplied to said engine is than 100% at engine steady-state operating conditions.

12. A system in accordance with claim 7 wherein said hydrogen-containing fuel gas is hydrocarbon reformate, and wherein said hydrogen-containing fuel gas supply system includes a hydrocarbon catalytic reformer.

13. A system in accordance with claim 12 wherein said reformer includes means for combustive preheating of catalytic elements in said reformer.

14. A system in accordance with claim 12 wherein said hydrocarbon fuel supply system and said hydrogen-containing fuel gas supply system are each supplied with hydrocarbon fuel from a common hydrocarbon fuel reservoir.

15. A system in accordance with claim 11 wherein said optimum mixture is at least 90% hydrocarbon fuel at engine steady state operating conditions.

16. An internal combustion engine fueled by a hydrocarbon fuel and a hydrogen-containing fuel gas, said engine comprising:
    a) a hydrocarbon fuel supply system; and
    b) a hydrogen-containing fuel gas supply system, wherein said engine is fueled at least 90% by said hydrogen-containing fuel gas at engine start-up and by an optimum mixture of said hydrocarbon fuel and said hydrogen-containing fuel gas at engine steady-state operating conditions.

17. An engine in accordance with claim 16 further comprising a control system for regulating relative supply of said hydrocarbon fuel and said hydrogen-containing fuel gas at any given time.

18. A method for fueling an internal combustion engine with a hydrocarbon fuel and a hydrogen-containing fuel gas, comprising the steps of:
    a) starting said engine on a mixture of said fuel and said fuel gas wherein at least 30% of the motive energy of said engine is derived from said hydrogen-containing fuel gas; and
    b) progressively changing the supply ratio between said hydrocarbon fuel and said hydrogen-containing fuel gas such that, when said engine reaches an equilibrium operating temperature, an optimum fraction of the motive energy of said engine is derived from said hydrocarbon fuel and said hydrogen-containing fuel gas.

19. A method in accordance with claim 18 wherein said optimum fraction is at least 90% hydrocarbon fuel.

20. A method in accordance with claim 18 wherein 100% of the motive energy of said engine is derived from said hydrogen-containing fuel gas during said starting of said engine.

21. A method for fueling an internal combustion engine with a hydrocarbon fuel and a hydrogen-containing fuel gas, comprising the steps of:
   a) cranking said engine on a mixture of up to 100% of hydrocarbon fuel;
   b) starting said engine on a mixture of said fuel and said fuel gas wherein at least 30% of the motive energy of said engine is derived from said hydrogen-containing fuel gas; and
   c) progressively changing the supply ratio between said hydrocarbon fuel and said hydrogen-containing fuel gas such that, when said engine reaches an equilibrium operating temperature, an optimum fraction of the motive energy of said engine is derived from said hydrocarbon fuel and said hydrogen-containing fuel gas.

22. A method in accordance with claim 18 wherein said supply ratio is optimally changed to minimize levels of unburned hydrocarbons in an exhaust stream of said engine.

23. A method for fueling an internal combustion engine with a hydrocarbon fuel and a hydrogen-containing fuel gas, comprising the steps of:
   a) starting said engine on a mixture of said fuel and said fuel gas wherein at least 30% of the motive energy of said engine is derived from said hydrogen-containing fuel gas; and
   b) progressively changing the supply ratio between said hydrocarbon fuel and said hydrogen-containing fuel gas such that, when said engine reaches an equilibrium operating temperature, an optimum fraction of the motive energy of said engine is derived from said hydrocarbon fuel and said hydrogen-containing fuel gas, wherein said supply ratio is changed by adding hydrocarbon fuel to provide a second engine torque that exceeds a first engine torque that said optimum fraction can provide.

* * * * *